Sept. 26, 1933.    H. C. GRAVES, JR    1,928,420
ELECTRICAL SWITCHBOARD STRUCTURE
Filed Feb. 4, 1932    5 Sheets-Sheet 4

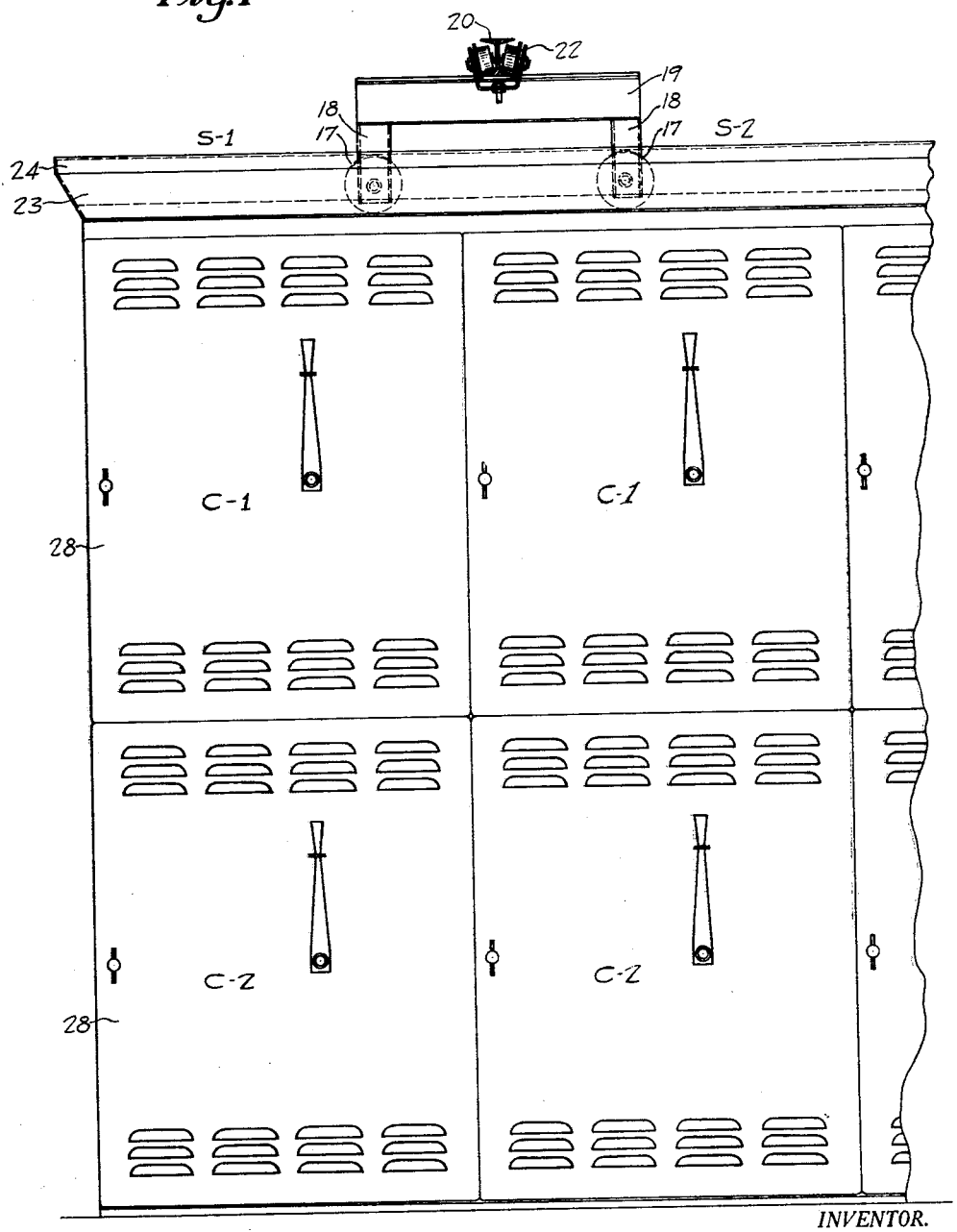

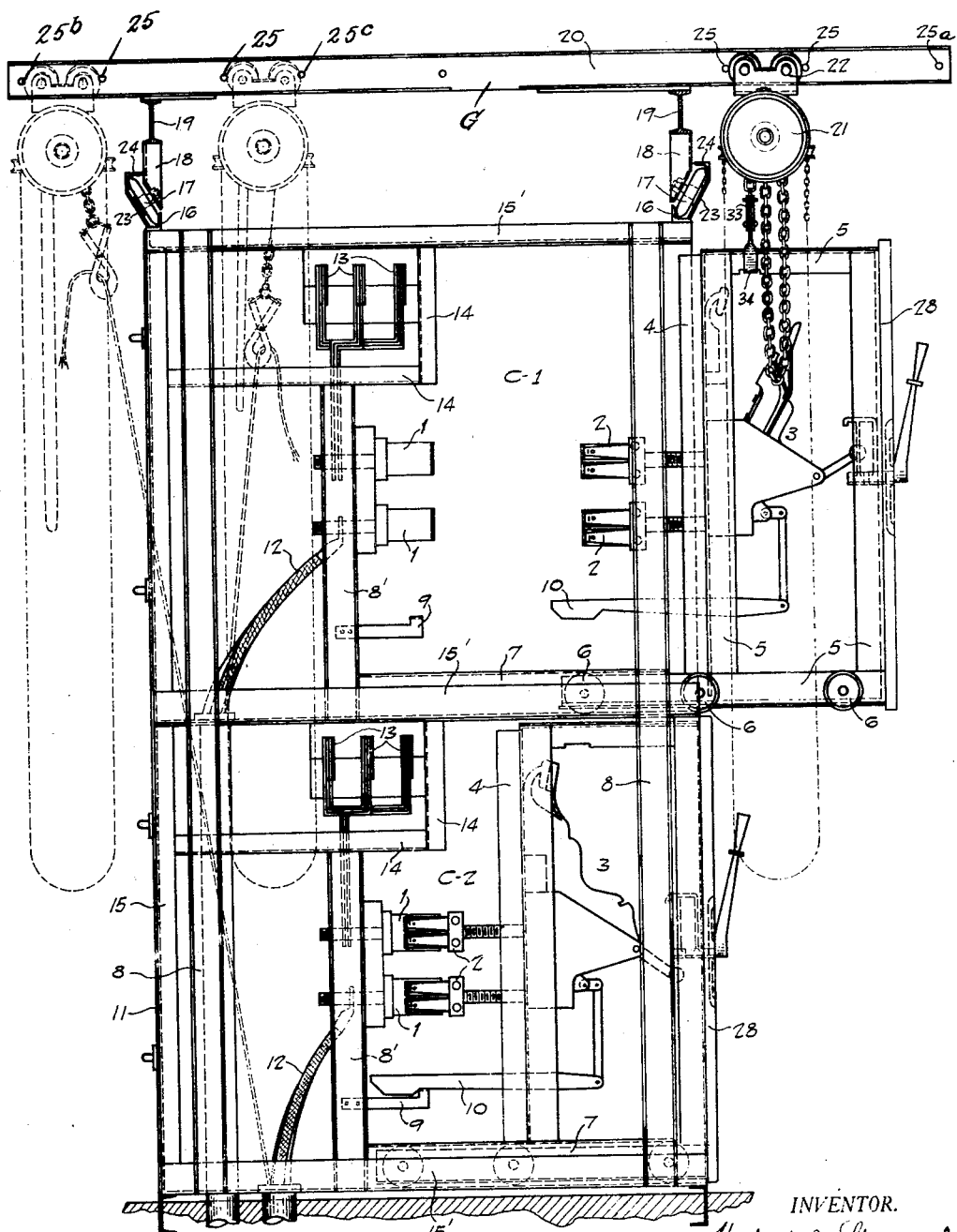

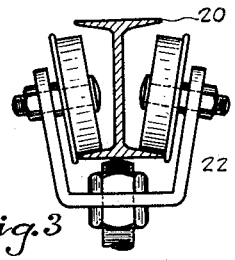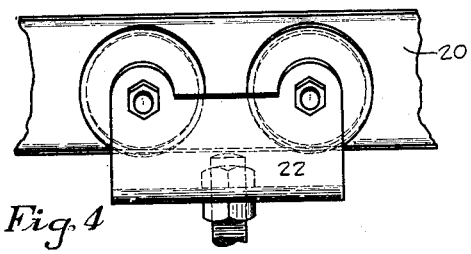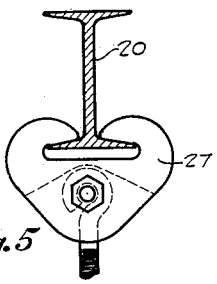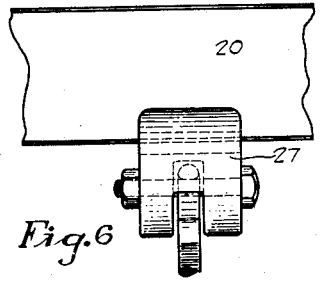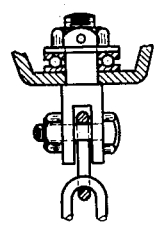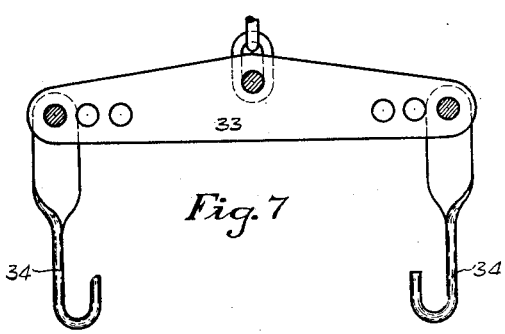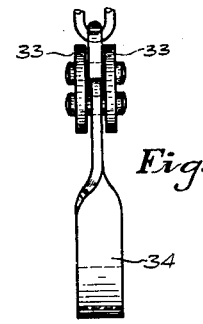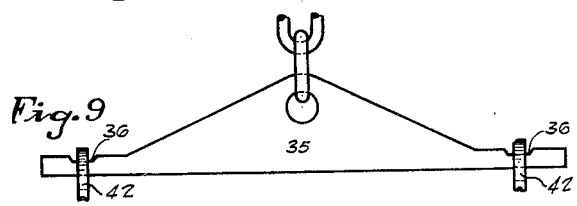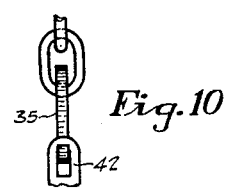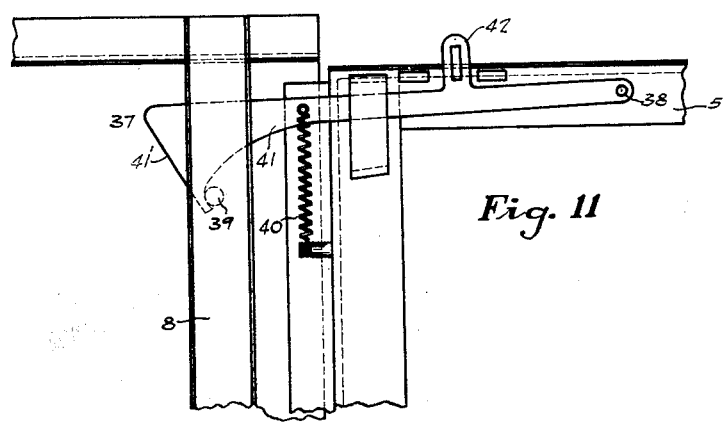

INVENTOR:
Herbert C. Graves Jr
BY
Cornelius L. Ehret
his ATTORNEY.

Patented Sept. 26, 1933

1,928,420

UNITED STATES PATENT OFFICE 1,928,420

ELECTRICAL SWITCHBOARD STRUCTURE

Herbert C. Graves, Jr., Radnor Township, Chester County, Pa., assignor to I-T-E Circuit Breaker Company, Philadelphia, Pa., a corporation of New Jersey Application February 4, 1932. Serial No. 590,868

17 Claims. (Cl. 175—298)

This invention relates to switchboard structure, and more particularly to the type of switchboard having a plurality of sections or units comprising cells, compartments, or housings enclosing removable circuit breaker or switch units and other switchboard apparatus and equipment.

In accordance with the invention, in a switchboard built up from a plurality of sections, each section comprising a framework, as of angle iron construction, and having one or more compartments or individual cells containing removable circuit breaker or switch units, or having removable panels carrying circuit breaker or switch structure, or other circuit indicating, protective, and control apparatus, the switchboard has hoisting mechanism, as a chain hoist, or equivalent, for handling the removable circuit breaker or switch units, or other removable apparatus, for ready inspection, repair or replacement purposes, and the hoisting mechanism travels on a track or run-way provided by the switchboard framework, so that the switchboard is a self-contained unit and may be installed in isolated locations, for example, in substations, or in any available space or desired location in shops or factories, where hoisting mechanism is not available. The invention also materially reduces the overhead clearance necessary where separate hoisting mechanism is used, and thus permits installation of the switchboard in places where the clearance is limited.

In one modification, the hoist may be employed at both the front and rear of the switchboard, and may therefore be used for pulling in the conductors and cables of the circuits leading thereto during installation of the unit, or for removal or replacement of the conductors for any reason; specifically, a chain hoist depends from a trolley which runs on a beam or rail extending transversely of the switchboard from front to back, and the beam is adapted to travel along a track or run-way on top of the switchboard frame, so that an overhead pull from any point above the switchboard may be obtained. Preferably, and as illustrated in the drawings, the beam is mounted on flangeless wheels which travel in the track or run-way, the axes of the wheels being mounted at such an angle that the thread of the wheels may bear both on a horizontal surface and a vertical surface of the track, thereby providing a rolling action between the track flange and the wheels to reduce friction.

Further in accordance with the invention, the switchboard is built up from a frame work defining a plurality of sections of the character aforesaid, each section having one or more compartments, or the sections may comprise one or more individual cells, and the frame work and sections are secured or tied together at the top by members of structural iron, including a track or runway upon which the hoisting mechanism travels, increasing the strength and rigidity of the switchboard frame work proper.

Where the circuit breakers or switches are removable as units, interlocking means are provided to prevent the units from leaving the supporting switchboard frame until they are safely supported from the hoisting mechanism; specifically, lifting hooks on the sides of a unit are pivotally secured to the upper frame of the unit, and engage fixed stops in the switchboard structure, when the unit is withdrawn a given distance, until the lift by the hoisting means on the hooks causes the unit and hooks to rise above and clear the stops, and thus permit removal of the unit.

The invention resides in the features of construction, combination, and arrangement hereinafter described and claimed.

In order to more clearly describe the invention, and to illustrate some of the various forms it may take, reference is had to the accompanying drawings, in which:

Fig. 1 is a front elevational view of one end of a switchboard constructed in accordance with the invention.

Fig. 2 is an end view of the section of switchboard shown in Fig. 1, with the cover removed.

Figs. 3 and 4 show details of a trolley used in the arrangement of Fig. 1.

Figs. 5 and 6 show a supporting means which may be substituted for the trolley of Figs. 3 and 4.

Figs. 7 and 8 are details of a lifting hook employed.

Figs. 9 and 10 show a modified form of lifting hook.

Fig. 11 shows a latching mechanism for limiting withdrawal of a switch element.

Fig. 16 shows a swivel which may be employed with any of the lifting means illustrated.

Figure 13:
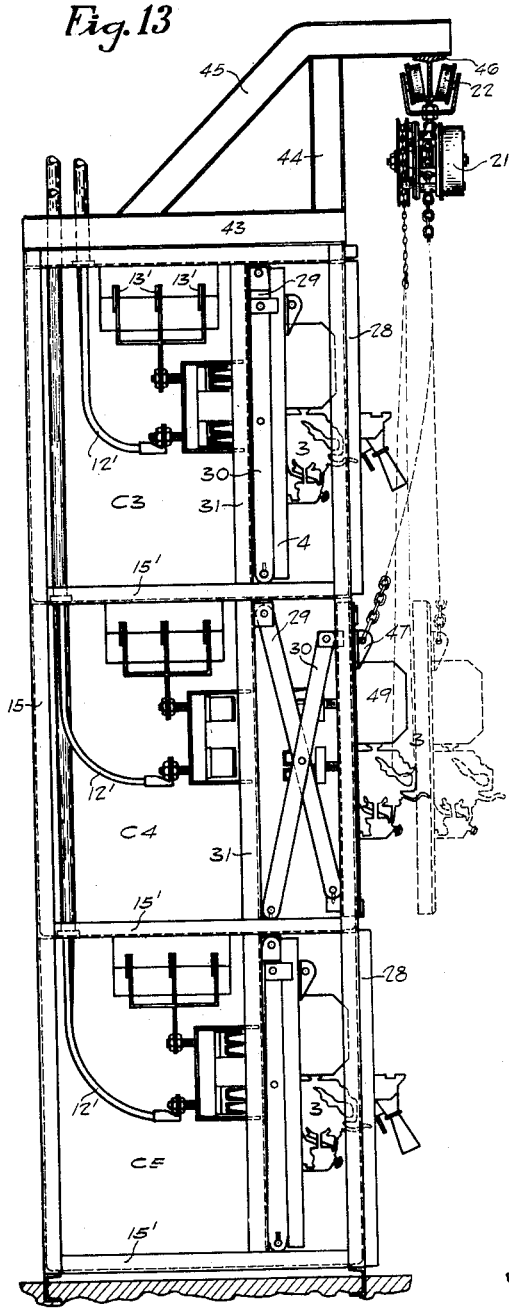
Figs. 12 and 13 are front and end elevational views respectively of a modified form of the invention.

Referring particularly to Figs. 1 and 2, there is shown one end of a switchboard having a typical grouping of sections, as S1 and S2 shown, each of the sections comprising, as shown most clearly in Fig. 2, two compartments, C1 and C2, each compartment containing a circuit breaker 3 of the truck type, the circuit breaker being mounted on a panel 4 of slate or other insulating material, supported in a framework or truck 5 mounted on rollers 6 which run in a track or runway 7, so that the circuit breakers can be withdrawn as a unit for inspection, repair and replacement purposes.

The compartments C1 and C2 are sub-divided into front and rear compartments by the upright channel iron frame members 8', upon which are mounted the fixed terminal blades 1 which are engaged by complementary contacts 2 of the circuit breaker when the latter is in operative position, as in the lower compartment C2. Withdrawal of the circuit breaker separates the terminals and contacts, as shown in the upper compartment C1. Interlocking members 9 and 10 co-act to trip the circuit breaker and cause it to open before the blade and contact elements 1 and 2 are separated, so that the circuit breaker cannot be withdrawn under load. The front and rear compartments of C1 and C2 are preferably isolated by sheet metal plates (not shown) attached to the frame members 8. The rear compartments comprise vertical runways for conductors 12 connected to the fixed terminal blades 1, and leading to circuits controlled by the circuit breakers. A horizontal runway or bus run for the bus or supply conductors 13 is divided by angle pieces 14 secured to the frame members 8 and 15. Compartments C1 and C2 are isolated from each other and from adjacent sections by sheet metal plates (not shown) and the rear of the switchboard is similarly enclosed by sheet metal plates 11.

The switchboard supporting structure or framework comprises channel iron uprights 8, 8', angle iron uprights 15, and cross members 15', which are preferably welded at their intersecting points to give a rigid frame support. On top of the supporting structure is mounted a pair of angle iron members 16 which are either bolted or welded at a plurality of points to the frame work of the various sections S1, S2, etc. These members tie the various sections together and brace the top of the switchboard; they also provide a track or runway for a hoist supporting carriage in the form of a frame or bridge. The hoist supporting frame or bridge comprises two pairs of wheels 17 which run on the rails 16, the axles of each pair of wheels being secured to angle iron leg portions 18 of a yoke or frame comprising I-beams 19 which support the main cross-beam 20. A chain hoist 21 of usual design is mounted below a trolley 22 which runs on the cross-beam 20, the chain hoist being adapted for removing, transferring and replacing switch units at the front of the switchboard. The supporting frame or bridge is adapted to run the entire length of the switchboard, and the hoist 21 is adapted to be moved along the beam 20 to any desired point.

The switchboard is of the type which is adapted to be completely assembled, with all internal connections, before shipping to its destination, so that the work of installation is limited principally to pulling in the connecting cables. In the embodiment of Figs. 1 and 2, the trolley 22 may be placed at the rear of the switchboard in various positions, indicated by dotted lines in Fig. 2, for pulling in the conductors or cables of the circuits leading to the switchboard. To change the hoist 21 from front to back of the switchboard, the stop pins 25a, 25 in front of the trolley are withdrawn to permit removal from beam 20; the hoist may then be positioned on beam 20 to either the rear of the back panel 11, or it may be positioned on beam 20 above the bus-compartments as indicated in dotted lines by inserting the trolley through the gap G of the flange of beam 20. Stop pins 25, 25b, 25c may be utilized to prevent movement from these positions.

Due to the fact that it is desirable to be able to have the hoist over the center of an end section, as S1 in Fig. 1, it is necessary to limit the horizontal spacing between the two wheels 17 on each side of the hoist supporting framework. In a four-wheel frame or truck in which the distance between the axles is small in comparison with the distance between the rails, however, it is necessary to provide some means to prevent the frame structure from turning in a horizontal plane, as would be the tendency when moved along the track by a force applied at the extreme end of the cross-beam 20. Also, a downward pull on the overhanging end of the beam causes a lift of the wheels on the opposite side. The turning movement is avoided by the use of flangeless wheels 17, having their axes at such an angle with respect to the rails 16, that the tread of the wheels will bear both on a horizontal surface and a vertical surface of the rails. This gives a rolling action between the flanged portion of the rails 16 and the wheels 17, which materially reduces friction due to torsion in a horizontal plane. The lifting of the wheels 17 is prevented by using top rails 24 and, preferably, side pieces 23, which may be welded, bolted or secured in any suitable manner to the switchboard framework. This arrangement also improves the appearance of the switchboard by forming a cornice at the top of the framework.

Movement of the hoist 21 along beam 20 may be prevented by the use of stop pins 25 inserted in holes in cross-beam 20, which lock the trolley in place to prevent motion when the hoist is loaded.

The lifting chain of the hoist is provided with lifting beams adapted to releasably engage the circuit breaker units at a desired point for lifting purposes. Figs. 7 and 8 show details of one form of lifting beam which comprises a pair of parallel beams 33 secured to the hoist chain, and having at each end hooks 34 adapted to engage the frame of the breaker units in the manner shown in Fig. 2. The beams 33 are pierced with a series of holes, Fig. 7, so that the distance between the hooks 34 is adjustable to accommodate circuit breaker units of various widths.

A different form of lifting beam is shown in Figs. 9 and 10, and comprises the yoke member 35 having notched portions 36 at each end for engaging lifting eyes 42 of circuit breaker units. Fig. 11 shows one of such units. A pair of lifting hooks in the form of cam levers 37 are pivotally mounted at 38 in the top of the truck frames 5, the lower surfaces 41 of the levers 37 being held by the tension of springs 40 against studs 39 fixed in the switchboard framework. When the truck is drawn out to the inspection position shown in Figs. 2 and 11, the action between each of the studs 39 and cam surface 41 of each lever pushes the cam lever 37 up, and the lower hooked end of each lever is engaged by the studs, as in the position of Fig. 11. This stops the truck with four wheels engaged with the channel 7, so that the weight of the circuit breaker unit is supported by the switchboard framework. The upward motion of the cam levers 37 has caused the lifting eyes 42 to extend above the top of the frame 5, the eyes being adapted to receive the ends 36 of the lifting beam 35. When the hoist is set taut, the cam levers 37 are lifted clear of the studs 39, the upper edge of the cam levers 37 resting against the truck frame 5 which is designed to carry the full weight of the unit. This arrangement constitutes a latching mechanism for preventing the trucks from being drawn beyond their point of support by the switchboard structure until the weight of the units has been supported by the hoist, when the latching means is automatically released. The cam surface 41' on the channel end of the cam levers 37 causes the levers to rise and permits the trucks to be inserted when there is no hoist required, as in the lower tier of compartments C2. In a similar manner the units may be removed from the lower tier by releasing the lever 37 by hand. If circuit breaker units are provided with other locking mechanisms for holding them in various positions in their frames, a connection may be arranged between the locking mechanisms and the lever 37 to prevent duplication of parts or functions.

It may be desirable to utilize a hoisting mechanism at the front of a switchboard only, and in certain cases this may be necessary due to the fact that circuits are sometimes carried out through the top of the switchboard structure, as shown in Fig. 13, and a modification of the hoisting structure is shown in Figs. 12 to 15 inclusive. This modification requires but a single rail 46 which extends the length of the switchboard and comprises a support for the trolley 22 and hoist 21. The rail 46 is supported at intervals along the switchboard structure by angle pieces 45, these pieces having upright supports 44 at the front of the switchboard and connected, as by welding or bolting, to the transverse beams 43. The angle pieces 45 are rigidly secured to the end sections of the switchboard and to one or more intermediate sections, and are also rigidly secured to the rail 46, thus providing a tie between the sections, and bracing the switchboard structure.

Figure 12:
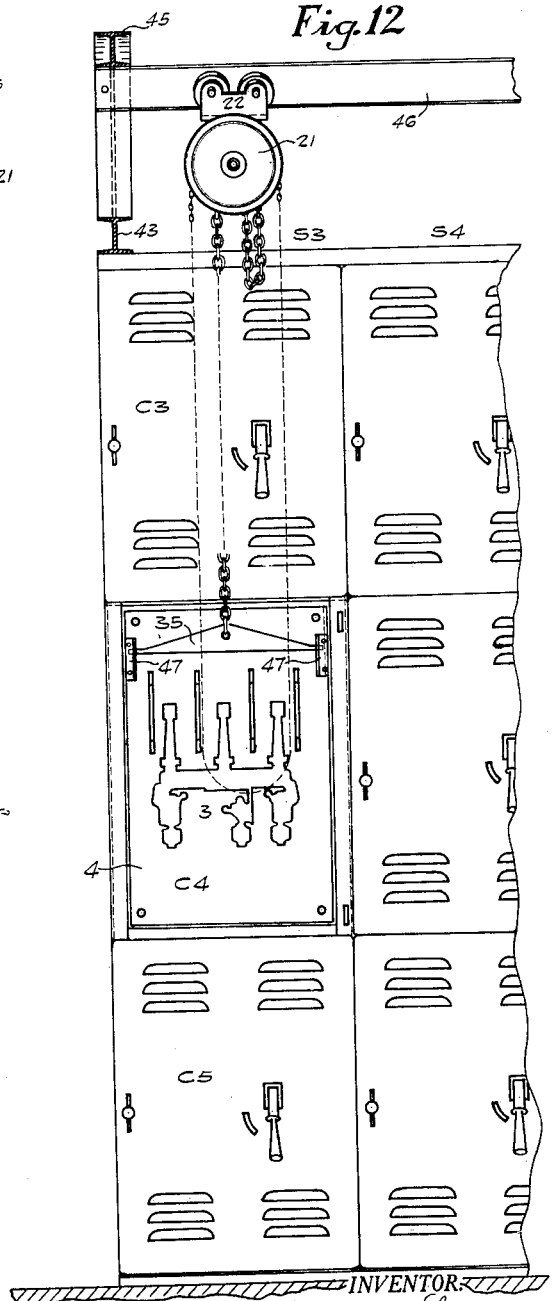

Figs. 12 and 13 show the hoisting apparatus in operating position. Fig. 12 is a front elevational view of one end of a switchboard having sections S3, S4, etc., each of the sections comprising three compartments C3, C4 and C5. Fig. 13 is an end view of the sections shown in Fig. 12, with the cover plate removed. Each of the compartments C3, C4 and C5 contains a circuit breaker 3 mounted on a panel 4, and having disengageable blade and contact elements, the panel 4 being supported by pantograph links 29 and 30 secured to the upright 31. The circuit breaker may be withdrawn, as shown in compartment C4 of Fig. 13, so that the lifting beam 35 can engage ears 47 secured to the circuit breaker panel for removing the unit, as shown in the dotted lines of Fig. 13. The front cover 28, which carries the handle and operating lever of the circuit breaker, may be either hinged at one side so that it opens to permit removal of the circuit breaker and its panel, or may be removable from the compartment structure.

Figures 14, 15:
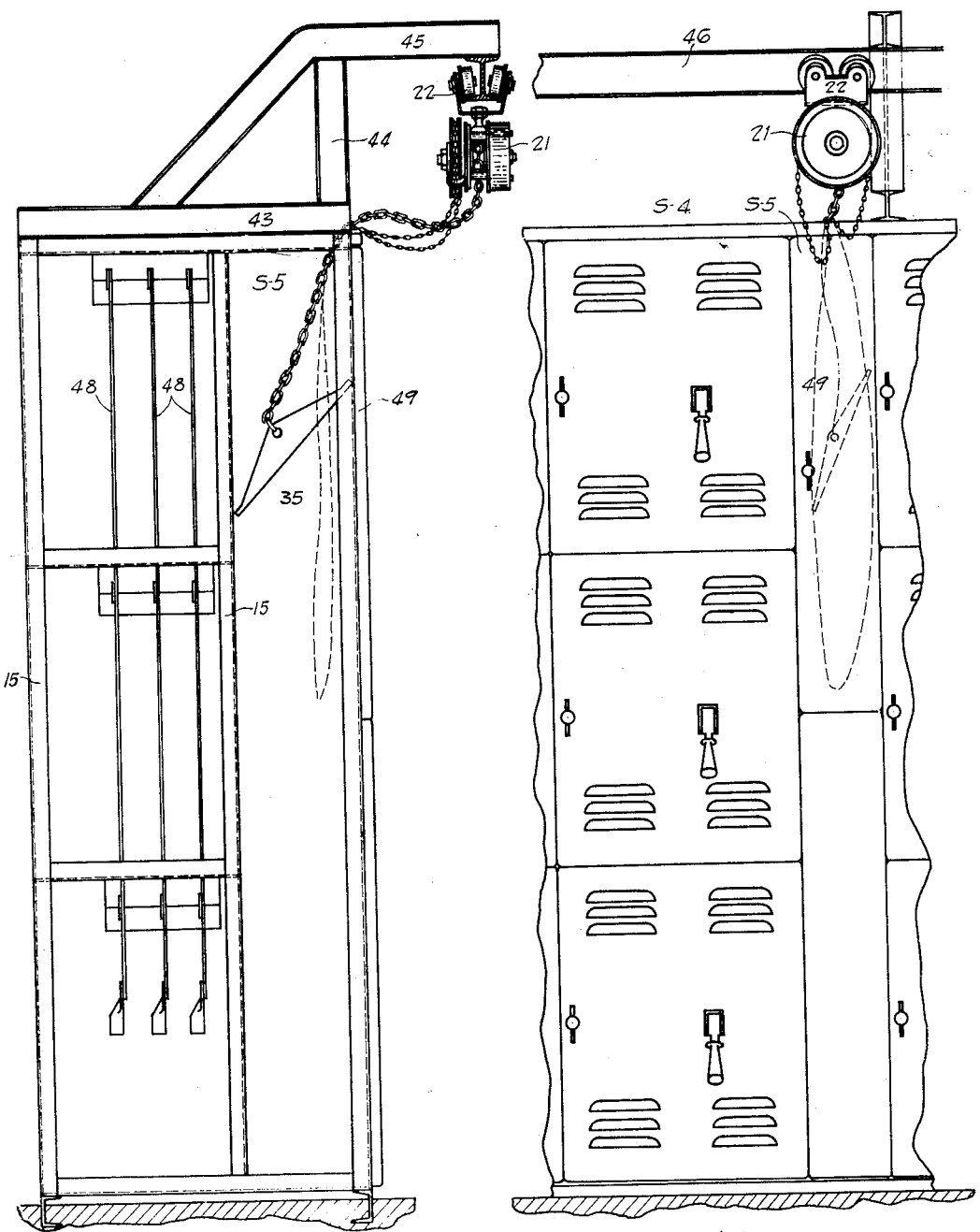
Figs. 14 and 15 are views of a compartment which may be used for enclosing the hoisting mechanism when not in use.

The conductors for supplying or distributing current to the circuit breakers comprise vertical runs which may be conveniently located in a special section S5, shown in Figs. 14 and 15, the section having a width just sufficient for the bus conductors 48. The compartment may be subdivided into front and rear compartments by uprights 15, and isolated from each other by sheet metal plates (not shown). The front part of the section is thus left free and may conveniently be used for stowing and concealing the hoisting chain and hand chain of the hoist when not in use. Fig. 14 shows the chain thus disposed through an open top portion of compartment S5. The upper front cover 49 of the compartment is preferably hinged so that the chains may be either stowed or removed with a minimum amount of trouble. This arrangement improves the appearance of the switchboard and eliminates the chances of accident and inconvenience due to hoist chains being in the way.

While a chain hoist is the form of hoisting mechanism illustrated, it will be understood that any other suitable hoisting means, for example, pulleys, blocks with rope or other tackle, and the like, may be employed. The construction and form of the hoisting mechanism carriage and runway, and the manner of securing the same to the switchboard, may also be varied with wide limits, dependent upon the type of switchboard and nature of the switch units employed, in a manner well understood in the art.

What I claim is:

1. In combination with a switchboard comprising a metal framework divided into compartments and having removable circuit breaker or switch units in certain of said compartments, hoisting means for handling and removing said units for inspection, repair or replacement purposes, the switchboard framework comprising a track along which said hoisting means travels.

2. In combination with a switchboard comprising a metal framework divided into compartments and having removable circuit breaker or switch units in certain of said compartments, means connected to said units whereby they may be moved to the front of said compartments, hoisting means for handling and removing said units for inspection, repair or replacement purposes, the switchboard framework comprising a runway on which said hoisting means travels.

3. In combination with an enclosed type of switchboard having removable circuit controlling devices in compartments and means whereby the devices are removable through the front of the switchboard, hoisting means adapted to travel along the front of the switchboard for handling and removing any of said devices for inspection, repair or replacement purposes, the switchboard framework comprising the supporting and traveling structure for said hoisting means.

4. In combination with an enclosed type of switchboard having removable circuit controlling devices in compartments positioned at different levels an having means whereby the devices are removable through the front of the switchboard, hoisting means adapted to travel along the front of the switchboard for handling and removing any of said devices from any level for inspection, repair or replacement purposes, the switchboard framework comprising a track along which said hoisting means travels.

5. In combination with a dead front switchboard having circuit breaker or switch units removable through the front of the switchboard, a chain hoist adapted to travel along the front of the switchboard for handling and removing said units for inspection, repair or replacement purposes, the switchboard framework comprising and supporting the traveling structure for said chain hoist.

6. In combination with a dead front switchboard having circuit breaker or switch units removable through the front of the switchboard, hoisting means adapted to travel along the front of the switchboard for handling and removing any of said units for inspection, repair and replacement purposes, and a supporting rail for said hoisting means extending along and supported solely by the switchboard framework.

7. In combination with a dead front switchboard having circuit breaker or switch units removable through the front of the switchboard, hoisting means adapted to travel along the front of the switchboard for handling and removing any of said units for inspection, repair and replacement purposes, a plurality of supporting rails for said hoisting means extending along the top of and supported solely by the switchboard framework.

8. In combination with a switchboard having a metal framework divided into compartments and having removable circuit breaker or switch units of the truck type in certain of said compartments, means whereby the trucks may be moved through the front openings of the compartments, hoisting means for handling and removing said trucks for inspection, repair or replacement purposes, the switchboard framework comprising a runway along which said hoisting means travels.

9. In combination with a switchboard having a metal framework divided into compartments and having removable circuit breaker or switch units of the truck type in certain of said compartments, means whereby the trucks may be moved through the front openings of the compartments, hoisting means for handling and removing said trucks for inspection, repair or replacement purposes, means on said trucks for preventing withdrawal of the trucks from the switchboard structure until the weight of the truck is supported by said hoisting means, the switchboard framework comprising the supporting and traveling structure for said hoisting means.

10. In combination with a switchboard having a metal framework divided into compartments and having removable circuit breaker or switch units of the truck type in certain of said compartments, means whereby the trucks may be moved through the front openings of the compartments, hoisting means for handling and removing said trucks for inspection, repair or replacement purposes, means comprising latching structure on said trucks cooperating with means on the switchboard framework for preventing withdrawal of the trucks from the switchboard structure until the weight of the trucks is supported by said hoisting means, the switchboard framework comprising the supporting and traveling structure for said hoisting means.

11. In combination with a switchboard having a metal framework divided into compartments and having removable circuit breaker or switch units of the truck type in certain of said compartments, means whereby the trucks may be moved through the front openings of the compartments, hoisting means for handling and removing said trucks for inspection, repair or replacement purposes, means on said trucks comprising a cam lever cooperating with a fixed stop on the switchboard framework for preventing withdrawal of the trucks from the switchboard structure until the weight of the truck is supported by said hoisting means, the switchboard framework comprising the supporting and traveling structure for said hoisting means.

12. In combination with a dead front switchboard having circuit breaker or switch units removable through the front of the switchboard, a chain hoist adapted to travel along the front of the switchboard for handling and removing said units for inspection, repair or replacement purposes, the switchboard framework comprising and supporting the traveling structure for said chain hoist, and a compartment in said switchboard having an opening through which the chains depending from said hoist may pass, and adapted to stow said depending chains when the hoist is not in use.

13. In combination with an enclosed type of switchboard having removable circuit controlling devices in compartments and means whereby the devices are removable through the front of the switchboard, hoisting means adapted to travel along the front of the switchboard for handling and removing any of said devices for inspection, repair or replacement purposes, the switchboard framework comprising the supporting and traveling structure for said hoisting means, and lifting members on said devices adapted to be releasably engaged by said hoisting means.

14. In combination with switchboard structure comprising sections, each section comprising one or more cells for housing removable circuit breaker or switch units, a structural iron member extending substantially the length of the switchboard at the top thereof and securing the sections together, hoisting means for handling and removing said suits for inspection, repair or replacement purposes, said structural iron member comprising a runway upon which said hoisting means travels.

15. A switchboard divided into sections with compartments containing removable circuit controlling units, rails supported by and extending along said sections, and a hoist-supporting carriage, movable along and having wheels engaging said rails, for handling and removing said units, the length of the carriage being sufficiently limited to permit the hoist to be positioned substantially over the center of the end sections of the switchboard, the axes of said wheels being disposed at such angle that lateral or torsional movement of the carriage is resisted by rolling motion of said wheels.

16. A switchboard divided into front compartments containing removable circuit-controlling units, and rear compartments, rails supported by and extending along said switchboard, and a travelling hoist movable along said rails for pulling cables into said rear compartments, and for handling and removing said units for inspection, replacement or repair.

17. In combination with a switchboard having compartments containing circuit breakers of the truck type, means whereby the trucks may be moved substantially horizontally through an open side of said compartments, lifting means for handling said trucks for inspection, replacement or repair, and means on said trucks for preventing withdrawal of the trucks from their compartments until the weight of the truck to be removed is supported by said lifting means.

HERBERT C. GRAVES, JR.